(12) United States Patent
Kashihara et al.

(10) Patent No.: US 11,939,020 B2
(45) Date of Patent: Mar. 26, 2024

(54) SADDLE-TYPE VEHICLE AND BODY FRAME STRUCTURE THEREOF

(71) Applicant: KAWASAKI JUKOGYO KABUSHIKI KAISHA, Hyogo (JP)

(72) Inventors: Takeshi Kashihara, Kobe (JP); Hiroshi Tamura, Kobe (JP); Satoshi Morotomi, Kobe (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 158 days.

(21) Appl. No.: 17/376,556

(22) Filed: Jul. 15, 2021

(65) Prior Publication Data

US 2022/0097791 A1 Mar. 31, 2022

(30) Foreign Application Priority Data

Sep. 28, 2020 (JP) .................................. 2020-162378

(51) Int. Cl.
*B62J 35/00* (2006.01)
*B62J 37/00* (2006.01)

(52) U.S. Cl.
CPC .............. *B62J 35/00* (2013.01); *B62J 37/00* (2013.01)

(58) Field of Classification Search
CPC ............ B62J 35/00; B62J 37/00; B62K 11/06
See application file for complete search history.

(56) References Cited

U.S. PATENT DOCUMENTS

| 4,556,119 | A | * | 12/1985 | Shiratsuchi | ......... | B62K 25/283 |
| | | | | | | 180/219 |
| 5,480,001 | A | * | 1/1996 | Hara | ..................... | B62K 25/283 |
| | | | | | | 180/311 |
| 5,845,728 | A | * | 12/1998 | Itoh | ......................... | B62K 11/04 |
| | | | | | | 180/311 |
| 5,984,336 | A | * | 11/1999 | Hanafusa | ............... | B62K 11/04 |
| | | | | | | 280/281.1 |
| 6,182,640 | B1 | * | 2/2001 | Nakashima | ............ | F02M 37/20 |
| | | | | | | 123/514 |

(Continued)

FOREIGN PATENT DOCUMENTS

| JP | 59-45184 | 3/1984 |
| JP | 1-229791 | 9/1989 |

(Continued)

*Primary Examiner* — Kevin Hurley
*Assistant Examiner* — Michael R Stabley
(74) *Attorney, Agent, or Firm* — Wenderoth, Lind & Ponack, L.L.P.

(57) ABSTRACT

A saddle-type vehicle includes an engine, a vehicle body frame, a fuel tank, and a fuel pump configured to supply fuel from the fuel tank to the engine. The vehicle body frame includes a head pipe, one main frame extending rearward and downward from the head pipe, a cross member connected to the rear end of the main frame and extending in the vehicle width direction, a pair of left and right body frames extending downward and rearward from the cross member, and a pair of left and right seat rails connected to the pair of left and right body frames, respectively. The cross member is disposed in front of the fuel pump. The pair of left and right body frames are arranged to sandwich the fuel pump in the vehicle width direction in a top view, and are connected to the cross member.

8 Claims, 8 Drawing Sheets

(56) References Cited

U.S. PATENT DOCUMENTS

| | | | | |
|---|---|---|---|---|
| 7,201,246 B2* | 4/2007 | Brendelson | ............ | B62K 11/04 180/300 |
| 7,377,552 B2* | 5/2008 | Miyabe | ................... | B62J 35/00 180/68.5 |
| 7,883,101 B2* | 2/2011 | Taniguchi | .............. | B62K 19/12 280/281.1 |
| 7,992,901 B2* | 8/2011 | Hirano | .................... | B62J 35/00 280/833 |
| 8,016,321 B2* | 9/2011 | Shimomura | ............. | B62J 35/00 280/833 |
| 8,037,962 B2* | 10/2011 | Susaki | ................... | B62K 11/04 180/312 |
| 8,579,063 B2* | 11/2013 | Smith | .................... | B62K 11/04 280/852 |
| 8,851,496 B2* | 10/2014 | Hedtke | .................. | B62K 11/04 280/281.1 |
| 9,630,673 B2* | 4/2017 | Kono | ...................... | B62K 11/06 |
| 10,131,395 B2* | 11/2018 | Yamazaki | ................ | B62J 35/00 |
| 2004/0206566 A1* | 10/2004 | Katsura | .................. | B62K 11/04 180/219 |
| 2005/0045399 A1* | 3/2005 | Kudo | ................... | F02M 37/103 137/565.17 |
| 2007/0089713 A1 | 4/2007 | Koike et al. | | |
| 2010/0065363 A1* | 3/2010 | Goodwin | ............. | B62K 25/283 180/227 |

FOREIGN PATENT DOCUMENTS

| | | |
|---|---|---|
| JP | 9-76972 | 3/1997 |
| JP | 2005-67507 | 3/2005 |
| JP | 2007-137406 | 6/2007 |
| JP | 2015-67247 | 4/2015 |

* cited by examiner

SADDLE-TYPE VEHICLE AND BODY FRAME STRUCTURE THEREOF

BACKGROUND OF THE INVENTION

1. Field of the Invention

The present invention relates to a saddle-type vehicle and a body frame structure thereof.

2. Description of the Related Art

Conventionally, in the case of a motorcycle having a body frame structure in which a pair of left and right main frames extend from the head pipe, the degree of freedom of space around the frame is lowered. Therefore, for example, as shown in JP 2015-067247 A, a motorcycle having a body frame structure in which one main frame extends from the head pipe is disclosed.

SUMMARY OF THE INVENTION

Here, by using only one main frame, the capacity of a fuel tank supported by the main frame and arranged above the main frame can be increased. However, in the case of attaching a fuel pump configured to supply the fuel from the fuel tank to the engine, to the fuel tank, there is a problem that the degree of freedom in arranging the fuel pump is lowered due to the presence of the main frame.

Therefore, an object of the present invention is to provide a saddle-type vehicle and a body frame structure thereof in which a large-capacity fuel tank is provided by one main frame and the arrangement position of a fuel pump, attached to the fuel tank, can be secured.

On embodiment of the present invention is a saddle-type vehicle including
an engine;
a vehicle body frame;
a fuel tank; and
a fuel pump configured to supply fuel from the fuel tank to the engine.
The vehicle body frame includes
a head pipe;
one main frame extending rearward and downward from the head pipe;
a cross member connected to the rear end of the one main frame and extending in a vehicle width direction;
a pair of left and right body frames extending downward and rearward from the cross member; and
a pair of left and right seat rails connected to the pair of left and right body frames, respectively.
The cross member is disposed in front of the fuel pump.
The pair of left and right body frames are arranged to sandwich the fuel pump in the vehicle width direction in a top view, and are connected to the cross member.

According to the above configuration, the cross member is arranged in front of the fuel pump, and the pair of left and right body frames are arranged so as to sandwich the fuel pump in the vehicle width direction in a top view and connected to the cross member. Thereby, the arrangement position of the fuel pump can be secured.

It is preferable that the embodiment further has the following configurations.

(1) An engine support bracket that supports the engine is attached to the cross member.

(2) The fuel pump is attached to a flange formed on the lower surface of a rear portion of the fuel tank.

(3) The fuel tank is provided so as to overlap the main frame in a plan view and a side view.

(4) The vehicle body frame includes a first cross frame that connects the pair of left and right seat rails, and a second cross frame that connects the pair of left and right body frames.
A suspension support bracket that supports the rear suspension unit is provided so as to support the upper end of the rear suspension unit.
The suspension support bracket is provided so as to connect the first cross frame and the second cross frame.

(5) In the configuration (4), the fuel pump is located in front of the first cross frame and above the second cross frame.

(6) The fuel tank has a recess that is recessed upward at the bottom.
A predetermined gap is provided between the main frame and a side wall of the recess in the vehicle width direction.

(7) In the configuration (6), a cushioning member is provided between the cross member and the fuel tank.

According to the configuration (1), by attaching the engine support bracket to the cross member instead of the main frame, it is possible to allow the load from the engine to be dispersed in the vehicle width direction by the cross member, without being transmitted directly to the main frame.

According to the above configuration (2), since the fuel pump is attached to the lower surface of the rear part of the fuel tank, the fuel is concentrated by the gravity on the fuel pump located below. Therefore, the fuel pump can be placed behind the cross member while allowing the fuel in the fuel tank to be easily sucked.

According to the configuration (3), it is possible to arrange the fuel tank having a larger capacity than the case where the fuel tank and the main frame are displaced from each other in the plan view and the side view.

According to the configuration (4), since the load from the rear suspension unit is transmitted to the first cross frame and the second cross frame via the suspension support bracket, the load can be dispersed without being transmitted to the main frame directly.

According to the configuration (5), the pump can be arranged by effectively utilizing the space between the frames.

According to the above configuration (6), a harness and pipes such as a brake pipe can be arranged between the recess and the main frame.

According to the configuration (7), vibration of the fuel tank can be suppressed by the cushioning member.

Another embodiment of the present invention is a body frame structure of a saddle-type vehicle. The structure includes
a head pipe;
one main frame extending rearward and downward from the head pipe;
a cross member connected to a rear end of the one main frame and extending in a vehicle width direction;
a pair of left and right body frames extending downward and rearward from the cross member; and
a pair of left and right seat rails connected to the pair of left and right body frames, respectively.

According to the above configuration, the cross member extending in the vehicle width direction is provided at the rear end of the main frame, and the pair of left and right body frames are provided so as to extend downward and rearward from the cross member. Thereby, the arrangement position of the fuel pump that sucks the fuel in the fuel tank can be secured.

In short, according to the present invention, it is possible to provide a saddle-type vehicle and a body frame structure thereof that enables the degree of freedom in the arrangement of a fuel tank to be enhanced.

DETAILED DESCRIPTION OF THE INVENTION

Hereinafter, a motorcycle will be described as an example of a saddle-type vehicle according to an embodiment of the present invention with reference to the accompanying drawings. For convenience of explanation, description will be given based on the definition that the travel direction of a motorcycle is "front (forward)" of the motorcycle and each part, and the left and right in the vehicle width direction when the occupant on the motorcycle looks forward are "left and right" of the motorcycle and each part.

(Overall Structure)

Figure 1:
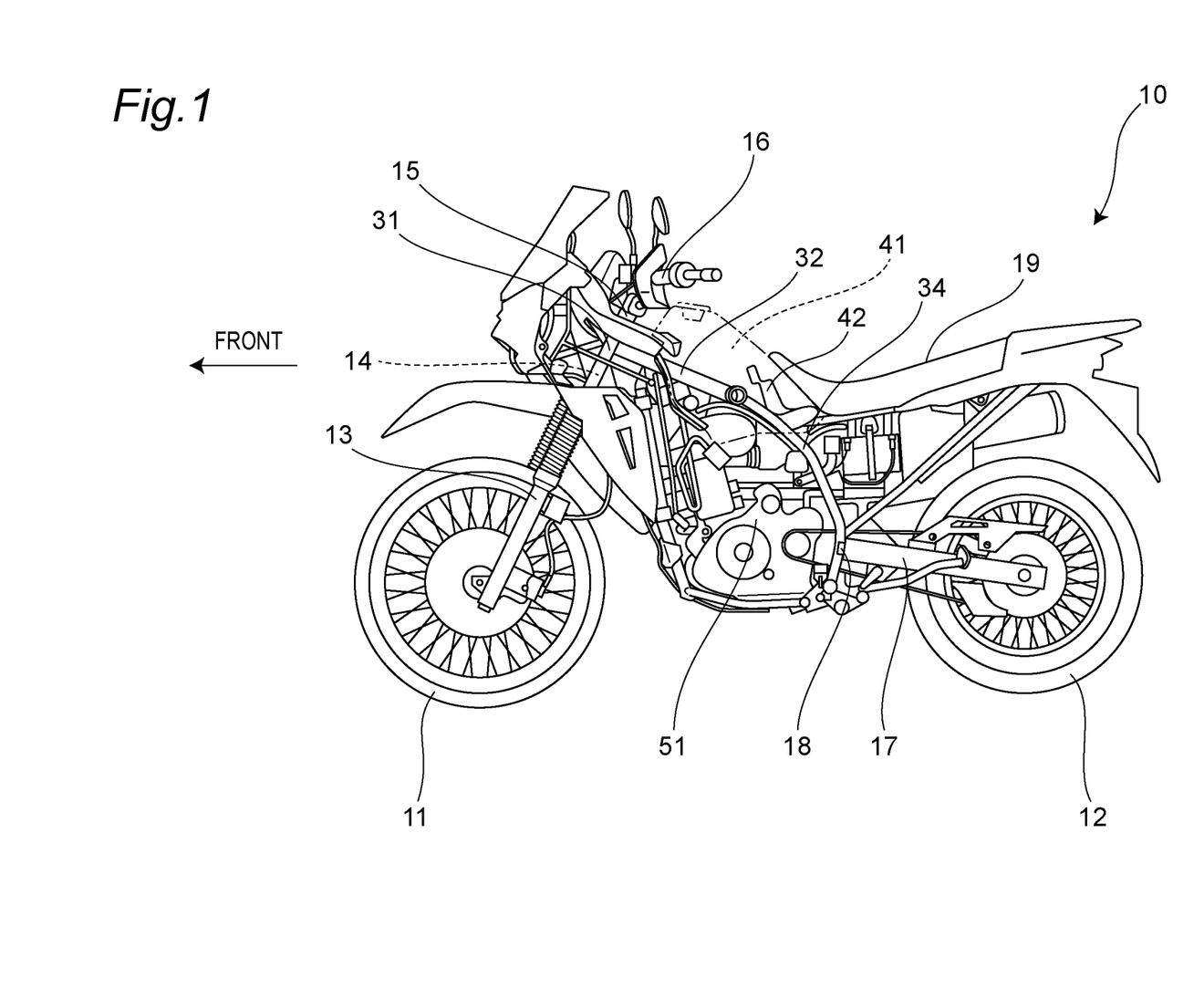
FIG. 1 is an overall side view of a motorcycle according to an embodiment of the present invention.

FIG. 1 is an overall side view of a motorcycle 10 according to an embodiment of the present invention. As shown in FIG. 1, the motorcycle 10 includes a front wheel 11 and a rear wheel 12, and the front wheel 11 is rotatably supported by a lower portion of a front fork 13 extending substantially in the vertical direction. The front fork 13 is supported by a steering shaft 14. The steering shaft 14 is rotatably supported by a head pipe 31. A bar-shaped steering wheel 16 extending to the left and right is attached to an upper bracket 15 provided at the upper end of the steering shaft 14. Therefore, when the driver swings the steering wheel 16 left and right, the front wheel 11 is steered with the steering shaft 14 as the rotation axis.

A main frame 32 extends rearward and downward from a head pipe 31, and the front end of a swing arm 17 is supported by a pivot shaft 18 at the rear portion of a body frame 34 located behind the main frame 32. The rear wheel 12 is rotatably supported at the rear end of the swing arm 17.

A fuel tank 41 is disposed above the main frame 32 and behind the steering wheel 16, and a driver's seat 19 is disposed behind the fuel tank 41. An engine 51 is disposed below the fuel tank 41. Then, the power of the engine 51 is transmitted to the rear wheel 12 via a chain or the like.

A fuel pump 42 that sucks the fuel in the fuel tank 41 and supplies the fuel to the engine 51 is attached to the bottom surface of the rear portion of the fuel tank 41. The fuel pump 42 is provided so as to incline forward as it advances upward from the bottom surface of the fuel tank 41.

(Body Frame Structure)

Figure 2:
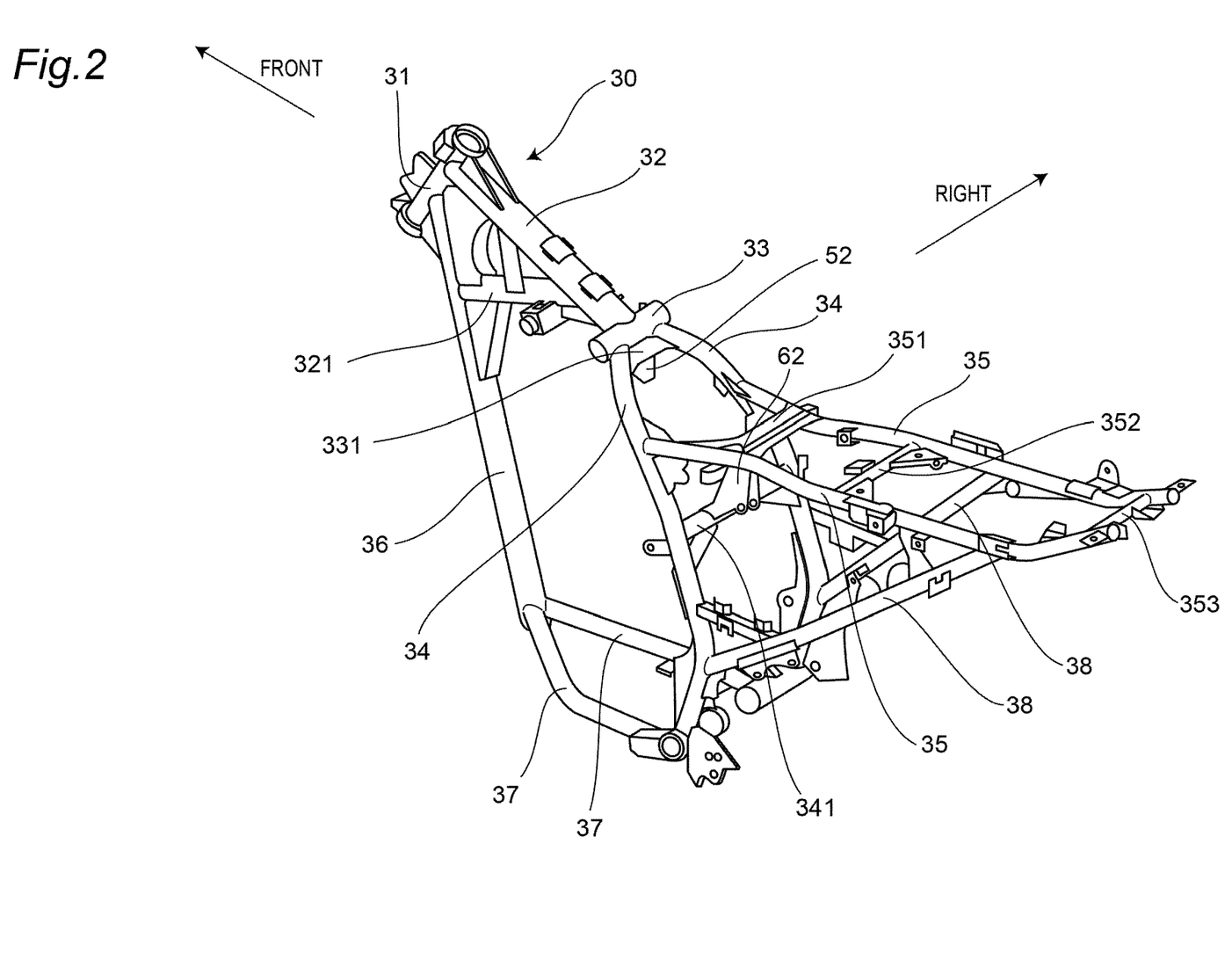
FIG. 2 is a perspective view of a vehicle body frame of the motorcycle.
Figure 3:
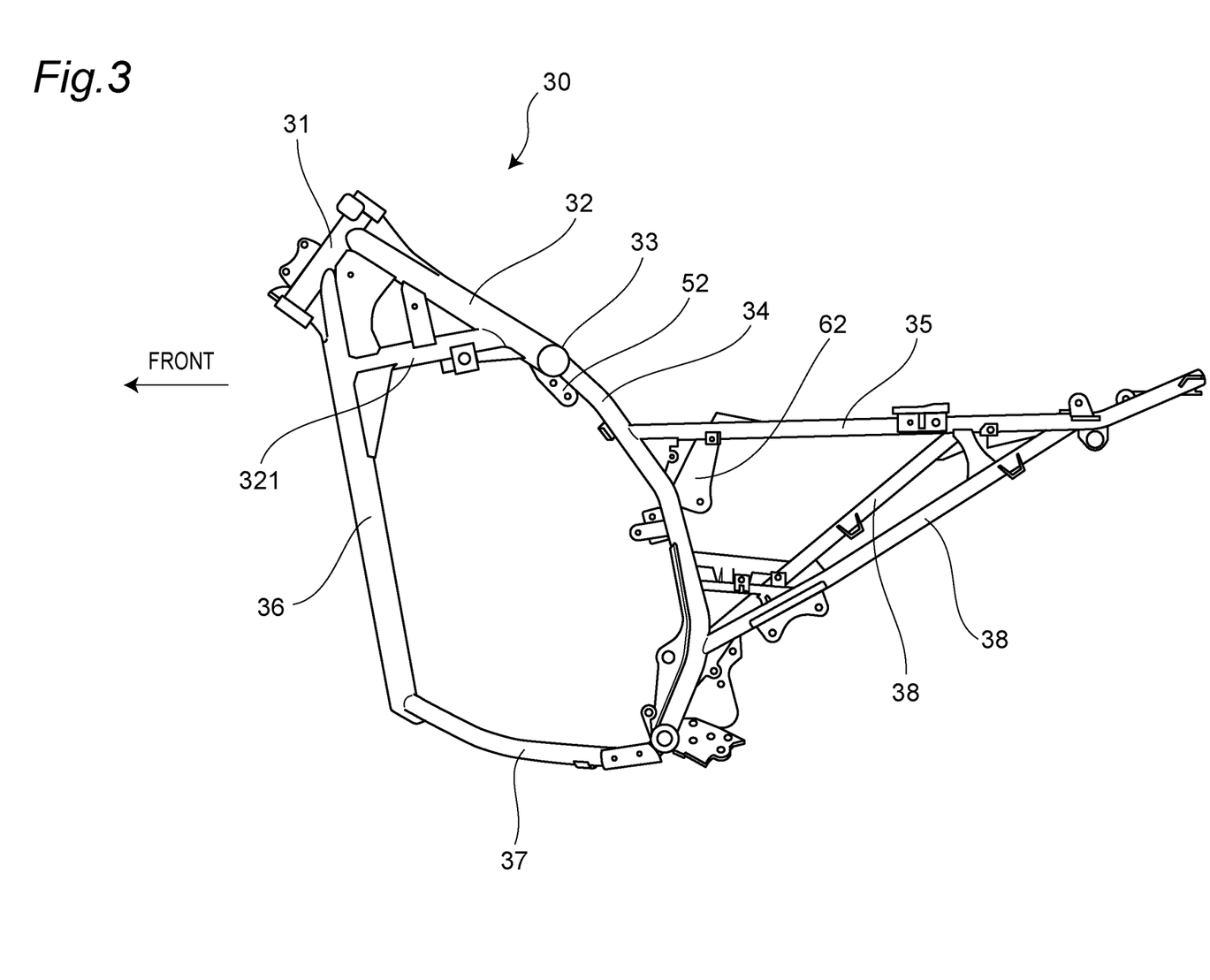
FIG. 3 is a side view of the vehicle body frame.
Figure 4:
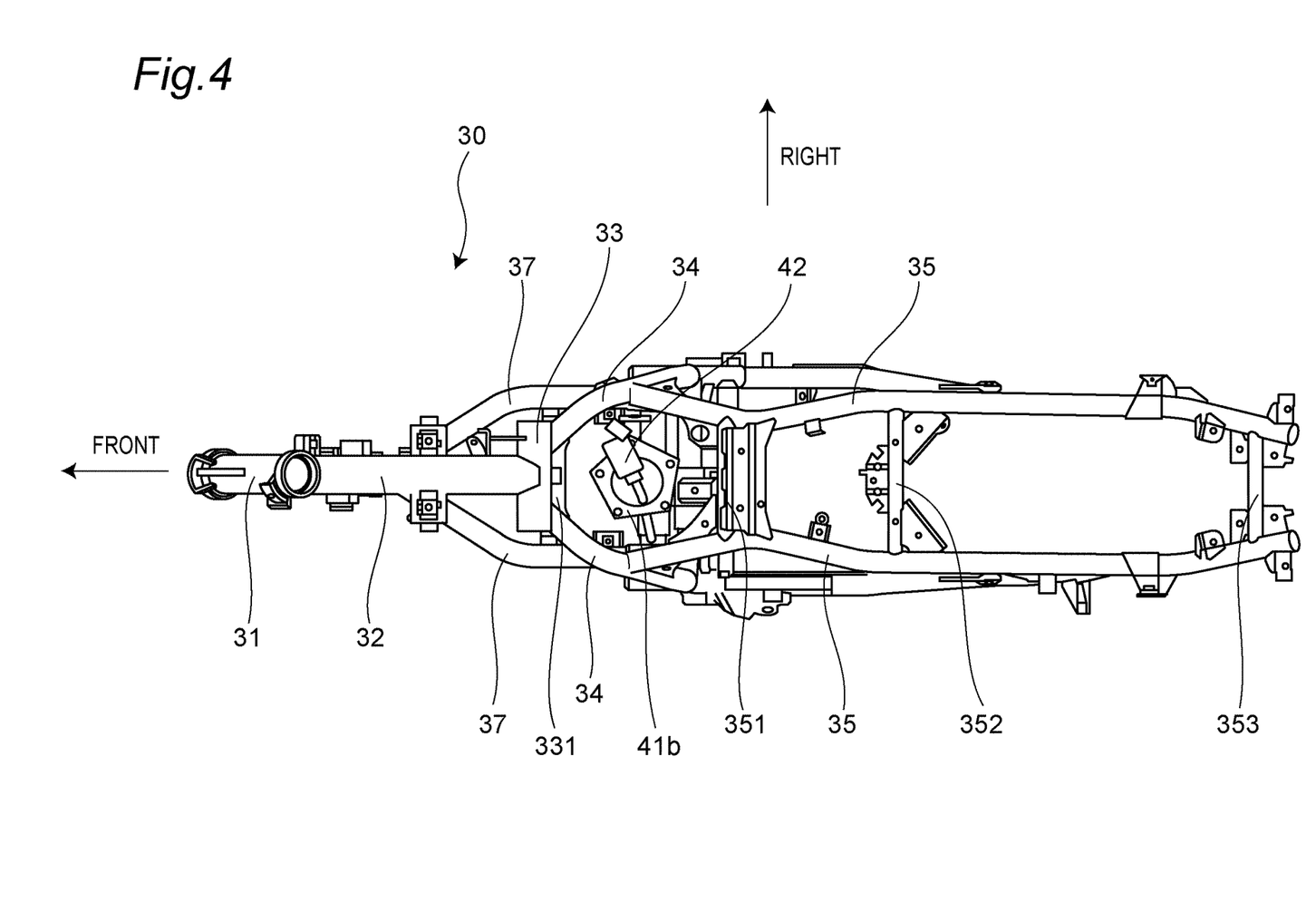
FIG. 4 is a top view of the vehicle body frame.

FIG. 2 is a perspective view of the vehicle body frame 30 of the motorcycle 10, FIG. 3 is a side view of the vehicle body frame 30, and FIG. 4 is a top view of the vehicle body frame 30. As shown in FIGS. 2 to 4, the vehicle body frame 30 has a frame forming the vehicle body structure of the motorcycle 10, and includes the head pipe 31, the one main frame 32 extending rearward and downward from the head pipe 31, a cross member 33 connected to the rear end of the main frame 32 and extending in the vehicle width direction, the pair of left and right body frames 34 extending downward and rearward from the cross member 33, a pair of left and right seat rails 35 connected to the pair of left and right body frames 34, respectively, one down frame 36 extending substantially downward from the head pipe 31, a pair of left and right lower frames 37 connected to the lower end of the down frame 36, and a pair of left and right rear frames 38 extending rearward and upward from the rear portion of the pair of left and right body frames 34.

The main frame 32 is formed of a pipe having a circular cross section, and extends linearly from the head pipe 31 to the cross member 33. The main frame 32 passes through the center in the vehicle width direction of the vehicle body of the motorcycle 10, and the rear end of the main frame 32 is located in front of the rear end of the upper surface of the engine 51.

The cross member 33 is formed of a pipe having a circular cross section, and extends linearly in the vehicle width direction so as to be orthogonal to the main frame 32. The cross member 33 protrudes from the main frame 32 by the same length in the vehicle width direction, and the inner diameter of the cross member 33 is smaller than the inner diameter of the main frame 32. The cross member 33 is arranged so as to overlap the engine 51 in a plan view, and has a vehicle width direction dimension smaller than the vehicle width direction dimension of the pair of lower frames 37.

The rear end of the main frame 32 is cut out to fit the outer shape of the cross member 33. The main frame 32 is formed so that the protruding portion of the cross member 33 fits.

The body frames 34 each are formed of a pipe having a circular cross section, and extend downward and rearward from the rear surface of the cross member 33 as a left and right pair so as to be symmetrical with respect to the main frame 32. The inner diameter of each of the body frames 34 is smaller than the inner diameter of the cross member 33. The pair of left and right body frames 34 are connected by an intermediate cross frame 341 (second cross frame) extending in the vehicle width direction. That is, in the body frames 34, a crosslinked structure is formed by the cross member 33 and the intermediate cross frame 341.

In the side view, in the vicinity of the cross member 33, the extending direction of the main frame 32 and the extending direction of each of the body frames 34 have an angle, that is, the main frame 32 and the body frame 34 are connected to the cross member 33 so as to bend in a side view.

The front ends of the body frames 34 are provided with a space in the vehicle width direction, and are cut out so as to match the outer shape of the cross member 33. Each of the body frame 34 is formed so that the protruding portion of the cross member 33 fits into the notch of the body frame 34.

The outer ends in the vehicle width direction of the body frames 34 are located inside the outer ends in the vehicle width direction of the cross member 33, and the inner ends in the vehicle width direction of the body frames 34 are located outside the outer ends in the vehicle width direction of the main frame 32. The body frames 34 expand outward in the vehicle width direction as they advance rearward from the cross member 33.

A gusset (reinforcing plate) 331 is provided between the cross member 33 and the body frames 34. The reinforcing plate 331 has a thickness direction in the vertical direction, and is formed in a plate shape extending in the vehicle width direction. The front end portion of the reinforcing plate 331 is welded to the cross member 33, and end portions in the vehicle width direction of the reinforcing plate 331 are welded to the inner side surfaces in the vehicle width direction of the body frames 34, respectively.

The seat rails 35 each are formed of a pipe having a circular cross section, are located below the seat 19, and extend substantially straight rearward as a left and right pair from the pair of left and right body frames 34. The pair of left and right seat rails 35 are connected by a plurality of cross frames arranged in the front-rear direction and extending in the vehicle width direction, and support the seat 19 as the left and right pair. That is, in the seat rails 35, a crosslinked structure is formed by the cross member 33 and the cross frames.

The cross frames include a front frame (first cross frame) 351 located in front, a center frame 352 located behind the front frame 351, and a rear frame 353 located behind the center frame 352.

Each of the seat rails 35 is inclined inward in the vehicle width direction as it advances rearward from the body frame 34, and is inclined outward in the vehicle width direction as it advances rearward from the first cross frame 351 located at the foremost position. More specifically, the distance in the vehicle width direction between the left and right seat rails 35 decreases rearward up to the front frame 351 located in the foremost position, increases rearward from the rear of the front frame 351 up to the vicinity of the center frame 352, becomes substantially constant rearward from the vicinity of the center frame 352, and decreases in the rear end portion. The distance between the seat rails 35 in the vehicle width direction is the narrowest in the vicinity of the first cross frame 351, and the inner diameter of the seat rail 35 is smaller than the inner diameter of the body frame 34.

The down frame 36 is formed of a pipe having a circular cross section, and extends substantially downward from the head pipe 31 in a straight line. The inner diameter of the down frame 36 is substantially equal to the inner diameter of the main frame 32.

The main frame 32 and the down frame 36 are connected by a reinforcing frame 321 extending in the front-rear direction. The main frame 32, the down frame 36, and the reinforcing frame 321 are provided so that the connected portion thereof forms a triangular shape in the side view of the motorcycle 10. Further, the cross member 33 is located near the connecting position between the main frame 32 and the reinforcing frame 321.

The lower frames 37 each are formed of a pipe having a circular cross section, extend rearward as a left and right pair from the lower end of the down frame 36, and are connected to the lower ends of the pair of left and right body frames 34. The distance between the left and right lower frames 37 in the vehicle width direction increases toward the rear from the connected portion with the down frame 36 to the vicinity of the cross member 33 in the top view, and is almost constant toward the rear from the vicinity of the cross member 33 up to the connected portion with the body frame 34. The inner diameter of the lower frame 37 is substantially equal to the inner diameter of the body frame 34.

The rear frames 38 each are formed of a pipe having a circular cross section, extend rearward and upward as a left and right pair from the rear portion of the body frames 34, and are connected to the rear portion of the pair of left and right seat rails 35. The inner diameter of the rear frame 38 is substantially equal to the inner diameter of the seat rail 35.

(Engine, Fuel Tank, Fuel Pump)

Figure 5:
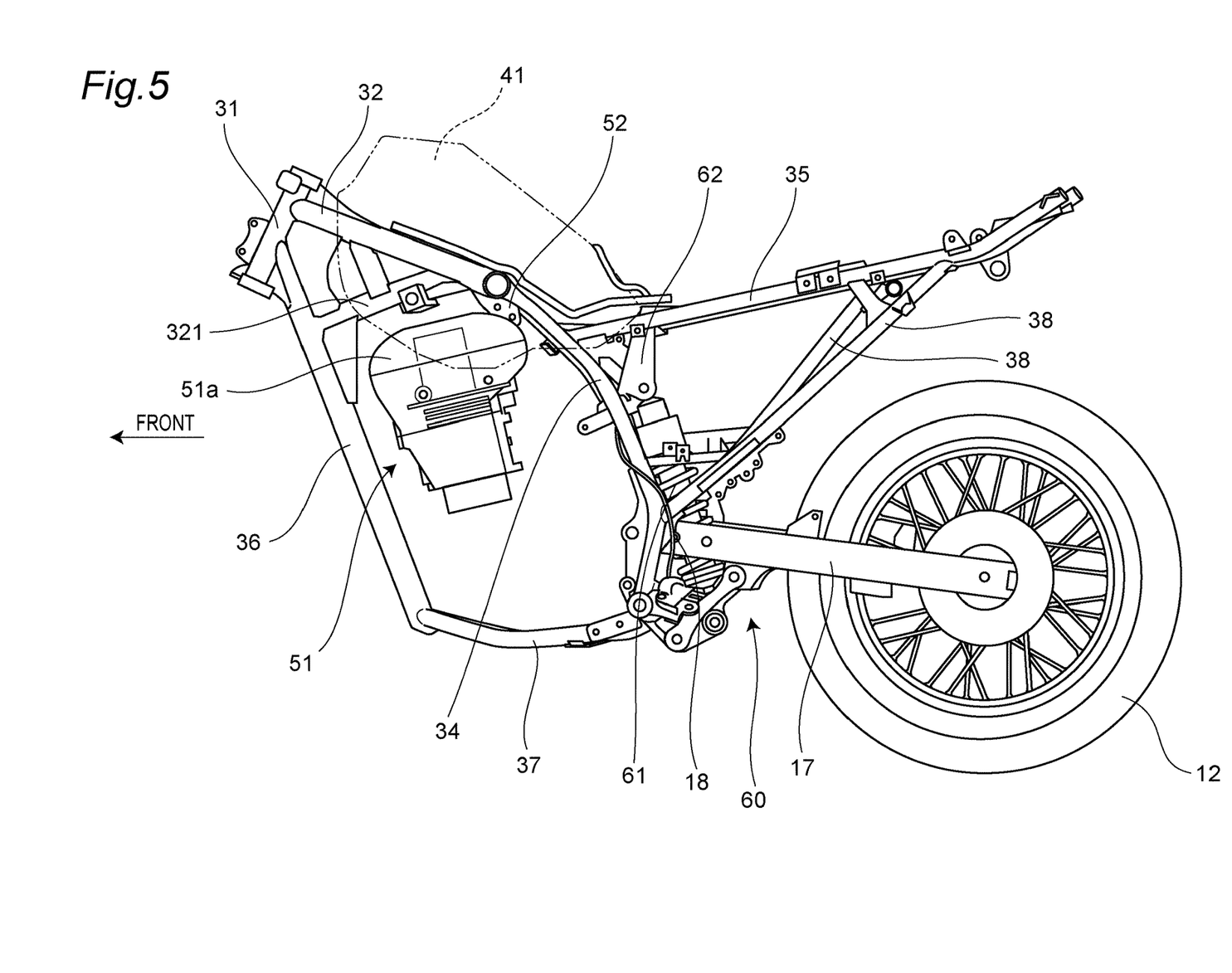
FIG. 5 is a perspective view of the vehicle body frame including a fuel tank, an engine, and a rear suspension unit.

FIG. 5 is a perspective view of the vehicle body frame 30 including a fuel tank 41, an engine 51, and a rear suspension unit 60. As shown in FIG. 5, an engine support bracket 52 that supports the engine 51 is attached to the cross member 33. More specifically, one engine support bracket 52 is attached to a central portion in the vehicle width direction of the cross member 33 so as to sandwich the rear end portion of a cylinder head cover 51a of the engine 51 from the outside in the vehicle width direction. The engine support bracket 52 includes a pair of left and right holding plates spaced apart in the vehicle width direction so as to sandwich the rear end portion of the cylinder head cover 51a.

Figure 6:
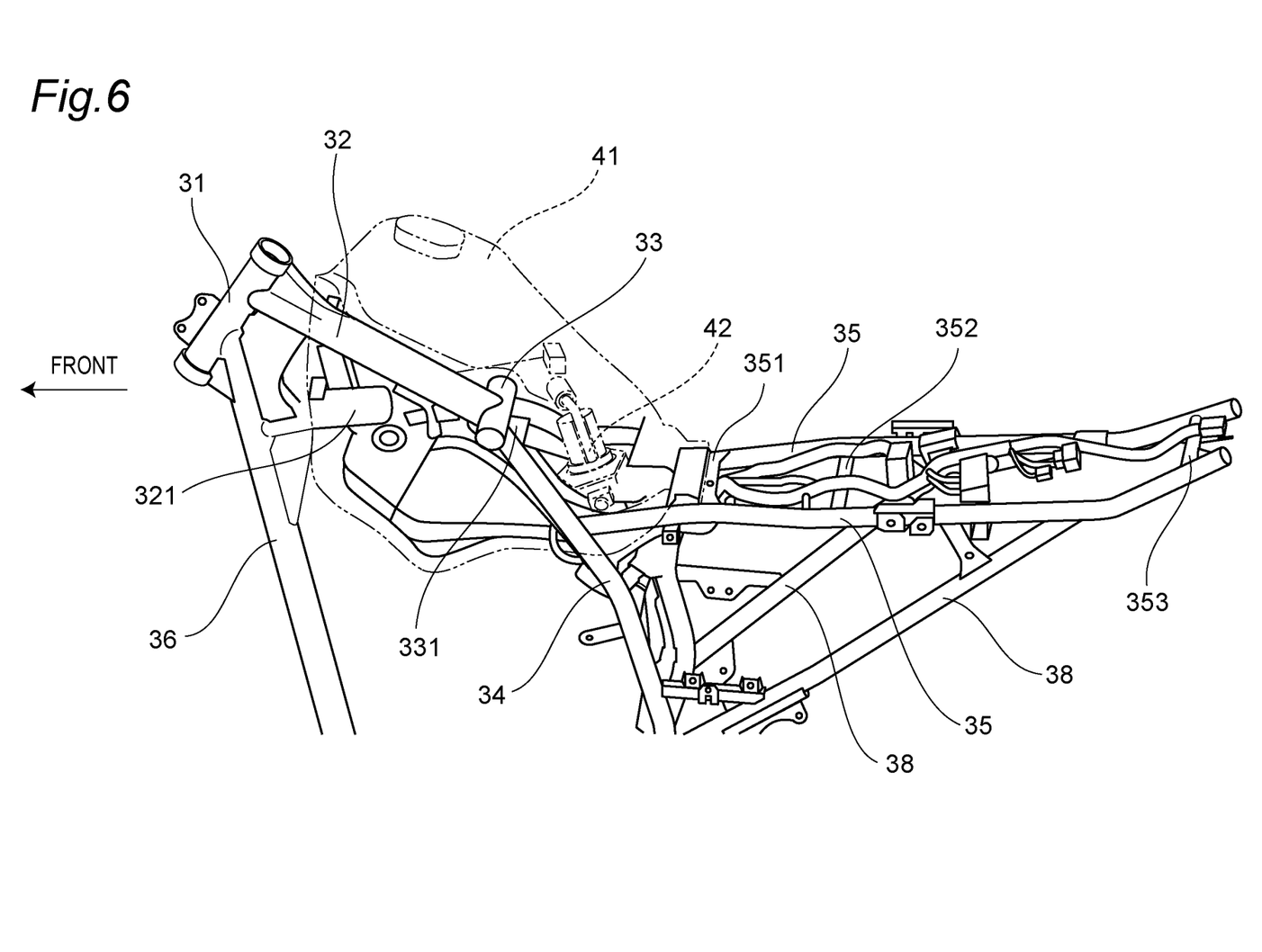
FIG. 6 is a perspective view showing that the fuel tank is supported by the vehicle body frame.
Figure 7:
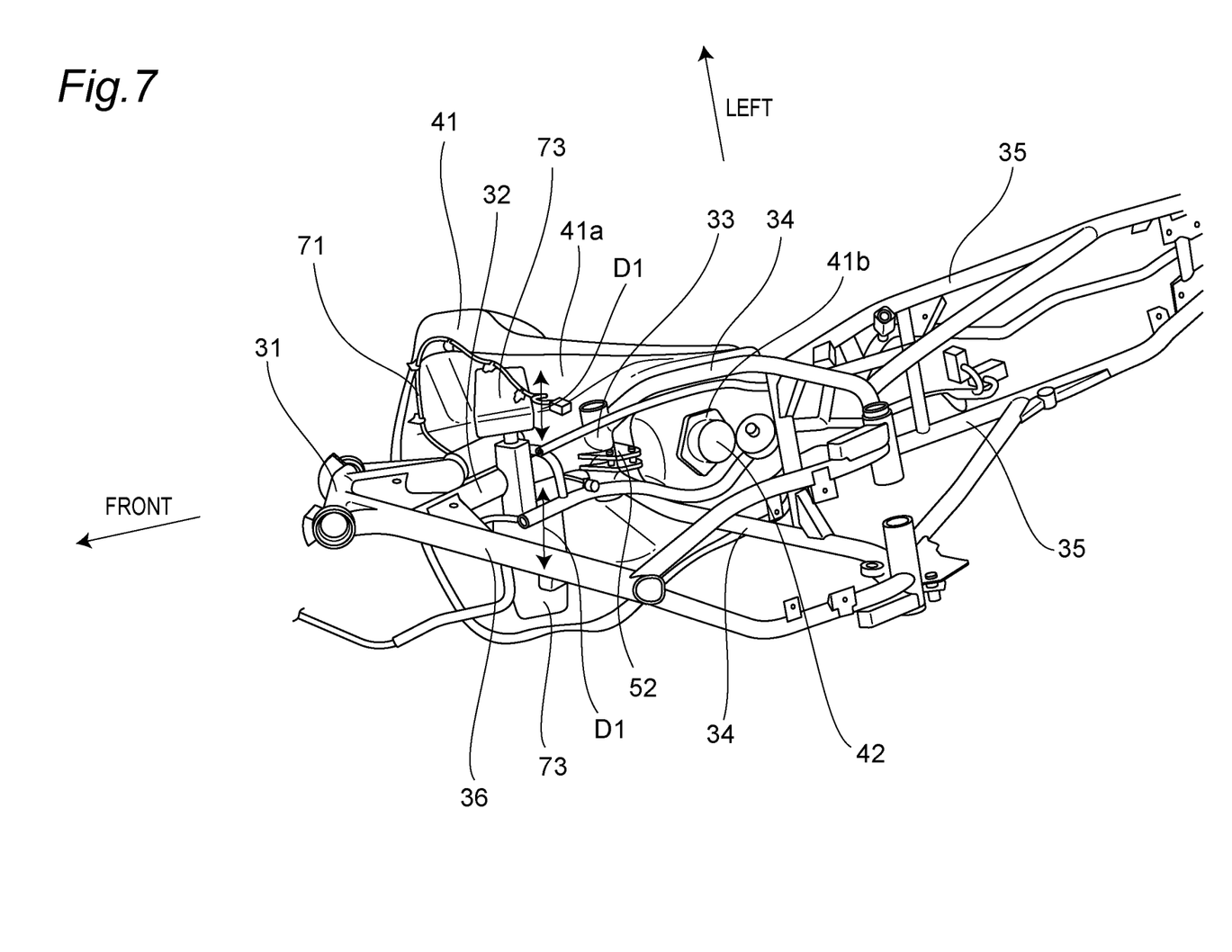
FIG. 7 is a perspective view of FIG. 6 as viewed from below.
Figure 8:
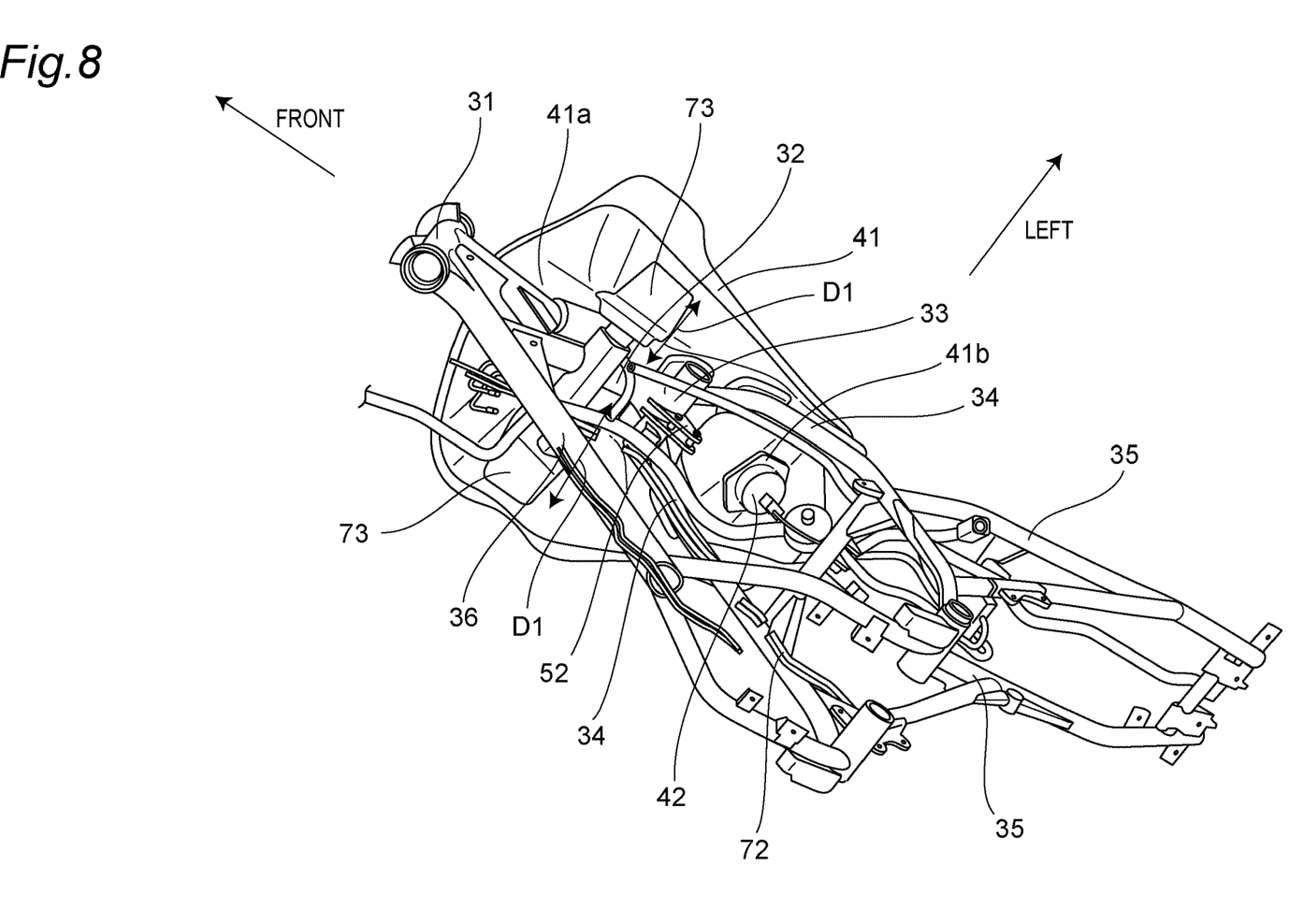
FIG. 8 is a perspective view of FIG. 6 as viewed from below at an angle different from that of FIG. 7.

FIG. 6 is a perspective view showing a state where the fuel tank 41 is supported by the vehicle body frame 30, FIG. 7 is a perspective view of FIG. 6 as viewed from below, and FIG. 8 is a perspective view of FIG. 6 as viewed from below at an angle different from that of FIG. 7. As shown in FIGS. 6 to 8, the fuel tank 41 is provided so as to surround the main frame 32 from above, and is supported by the main frame 32. The fuel tank 41 is provided so as to overlap the main frame 32 in a plan view and a side view. The surface mounted on the seat rail 35 is the lower end surface of the fuel tank 41.

The fuel tank 41 has a recess 41a that is recessed upward at the bottom, and a predetermined gap D1 is provided between the main frame 32 and the side wall of the recess 41a in the vehicle width direction. Then, with use of the gap D1, pipes such as a harness 71 used for power supply and the like and pipes such as a brake pipe 72 are arranged between the recess 41a and the main frame 32.

The vehicle width direction dimension of the cross member 33 is substantially the same as the vehicle width direction dimension of the portion of the recess 41a where the main frame 32 fits. The vehicle width direction dimension of the recess 41a is constant up to the front end of the cross member 33, and increases as it advances backward from the cross member 33.

Further, between the fuel tank 41 and the cross member 33, a cushioning member 73 that suppresses transmission of vibration from the fuel tank 41 to the cross member 33 is provided.

The fuel pump 42 is attached to a flange 41b formed on the rear bottom surface of the fuel tank 41. The upper part of the fuel pump 42 is located in the fuel tank 41, and the lower part of the fuel pump 42 is designed to be exposed downward from the flange 41b of the fuel tank 41. The fuel pump 42 is attached to the flange 41b so as to incline forward and upward. The flange 41b is arranged near the connected portions between the body frames 34 and the seat rails 35. The flange 41b is formed in a polygonal shape. Regarding the vehicle body frame 30, the cross member 33 has substantially the same length in the vehicle width direction as that of the first cross frame 351, and in the top view, the vehicle body frame 30 is sectioned by the cross member 33, the first cross frame 351, the body frame 34, and the seat rail 35, and is formed in a polygonal shape, more specifically, a hexagonal shape. The flange 41b is arranged so that the outer end of the flange 41b in the vehicle width direction is oriented so as to be close to the connecting position between the body frame 34 and the seat rail 35.

The fuel pump 42 is provided to the center portion in the vehicle width direction of the motorcycle 10, and is located in front of the front frame (first cross frame) 351 and above the intermediate cross frame 341 (second cross frame). Further, in the top view, the fuel pump 42 is surrounded by the cross member 33, the body frame 34, the seat rail 35, and the front frame 351. The fuel pump 42 extends at an angle along the body frame 34. The cross member 33, the front frame 351, and the body frame 34 and the seat rail 35 located between them are located in the recess 41a formed on the bottom surface of the fuel tank 41. Further, in the top view, the length of the cross member 33 in the vehicle width direction is longer than the length of the fuel pump 42 in the vehicle width direction.

(Rear Suspension Unit)

The rear suspension unit 60 that suppresses vibration from the rear wheel 12 includes a shock absorber 61 that is supported by the vehicle body frame 30 and absorbs shocks, and a swing arm 17 that is supported by the vehicle body frame 30 and is connected to the shock absorber 61 and the rear wheel 12 so as to be displaceable in the up and down direction. A suspension support bracket 62 that supports the rear suspension unit 60 is provided so as to support the upper end of the shock absorber 61, and the suspension support bracket 62 connects the front frame (first cross frame) 351 and the intermediate cross frame (second cross frame) 341.

According to the motorcycle 10 having the above configuration, the following effects can be exhibited.

(1) By using one main frame 32, it is possible to secure a wider space for the fuel tank 41 as compared with the case of two main frames 32, so that the capacity of the fuel tank 41 can be increased.

(2) The cross member 33 extending in the vehicle width direction is provided at the rear end of the main frame 32, and the pair of left and right body frames 34 are provided so as to extend downward and rearward from the cross member 33. Thereby, the arrangement position of the fuel pump 42 that sucks the fuel in the fuel tank 41 can be secured.

(3) By connecting the one main frame 32 and the pair of left and right body frames 34 via the cross member 33 extending in the vehicle width direction, it is possible to improve the rigidity of the vehicle body frame 30 against torsion in the rotational direction.

(4) By attaching the engine support bracket 52 to the cross member 33 instead of the main frame 32, it is possible to allow the load from the engine 51 to be dispersed in the vehicle width direction by the cross member 33, without being transmitted directly to the main frame 32.

(5) Since the fuel pump 42 is attached to the lower surface of the rear part of the fuel tank 41, the fuel is concentrated by the gravity on the fuel pump 42 located below. Therefore, the fuel pump 42 can be placed behind the cross member 33 while allowing the fuel in the fuel tank 41 to be easily sucked.

(6) Since the fuel tank 41 is provided so as to overlap the main frame 32 in the plan view and the side view, the fuel tank 41 having a larger capacity can be arranged compared with the case where the fuel tank 41 and the main frame 32 are at displaced positions in the plan view and the side view.

(7) The suspension support bracket 62 that supports the rear suspension unit 60 is provided so as to support the upper end of the rear suspension unit 60, and the suspension support bracket 62 is provided so as to connect the front frame (first cross frame) 351 and the intermediate cross frame (second cross frame) 341. As a result, the load from the rear suspension unit 60 is transmitted to the front frame (first cross frame) 351 and the intermediate cross frame (second cross frame) 341 via the suspension support bracket 62. Therefore, the load can be dispersed without being transmitted to the main frame 32 directly.

(8) Since the fuel pump 42 is located in front of the front frame (first cross frame) 351 and above the intermediate cross frame (second cross frame) 341, the fuel pump 42 can be arranged by effectively utilizing the space between the frames.

(9) Since the predetermined gap D1 is provided between the main frame 32 and the side wall of the recess 41a in the vehicle width direction, the harness 71 and pipes such as the brake pipe 72 can be arranged between the recess 41a and the main frame 32.

(10) Since the cushioning member 73 is provided between the cross member 33 and the fuel tank 41, vibration of the fuel tank 41 can be suppressed by the cushioning member 73.

(11) In the body frame 34, since the crosslinked structure is formed by the cross member 33 and the intermediate cross frame 341, the rigidity of the vehicle body frame 30 against torsion can be improved.

(12) In the seat rails 35, the cross member 33, the front frame (first cross frame) 351, the center frame 352, and the rear frame 353 form a crosslinked structure, so that the rigidity of the vehicle body frame 30 against torsion can be improved.

(13) Since the cross member 33 is configured to be longer in the vehicle width direction than the fuel pump 42 in the top view, interference between the fuel pump 42 and the body frame 34 can be prevented.

(14) The cross member 33, the front frame (first cross frame) 351, and the body frame 34 and the seat rail 35 located between them are located in the recess 41a formed on the bottom surface of the fuel tank 41. Therefore, a part of the vehicle body frame 30 can be effectively arranged in the space of the recess 41a on the bottom surface of the fuel tank 41.

(15) In the side view, in the vicinity of the cross member 33, the extending direction of the main frame 32 and the extending direction of the body frame 34 have an angle, that is, the main frame 32 and the body frame 34 are connected to the cross member 33 so as to bend in a side view. As a result, the capacity of the fuel tank 41 can be increased as compared with the case where the main frame 32 and the body frame 34 are parallel in the side view.

(16) Since the distance between the seat rails 35 in the vehicle width direction is narrowed near the first cross frame 351. That is, the width of the seat rails 35 is narrowed at the part of the driver's legs, so that the riding comfort on the motorcycle 10 can be improved.

(17) Since the main frame 32 is formed so that the protrusion of the cross member 33 fits thereto, it is easy to weld the main frame 32 and the cross member 33 by butting them against each other.

(18) Since the cross member 33 has a vehicle width direction dimension smaller than the vehicle width direction dimension of the pair of lower frames 37 in a plan view, it is possible to suppress the capacity of the fuel tank 41 from being reduced by the cross member 33.

(19) Since the inner ends of the body frames 34 in the vehicle width direction are located outside the outer ends of the main frame 32 in the vehicle width direction, it is easy to secure a large space near the rear end of the main frame 32 as compared with the case where the body frames 34 are connected to the main frame 32.

(20) Since the body frames 34 expand outward in the vehicle width direction as they advance rearward from the cross member 33, it is possible to prevent the size of the cross member 33 from being enlarged.

(21) Since the main frame 32, the down frame 36, and the reinforcing frame 321 are provided so that the connected portion thereof forms a triangular shape in the side view of the motorcycle 10, the support rigidity of the vehicle body frame 30 can be improved.

(22) Since the cross member 33 is located near the connecting position between the main frame 32 and the reinforcing frame 321, the load transmitted to the cross member 33 can be dispersed by the reinforcing frame 321.

In the above embodiment, the motorcycle 10 is described as an example, but the present invention is not limited to the motorcycle, and can be applied to saddle-type vehicles including those other than a motorcycle. The present invention is particularly preferably used for a motocross vehicle, a vehicle equipped with dirt tires for rough terrain, and a vehicle not equipped with safety parts, among motorcycles.

Various modifications and alterations can be made without departing from the spirit and scope of the present invention described in the claims.

What is claimed is:

1. A saddle vehicle comprising:
   an engine;
   a vehicle body frame;
   a fuel tank; and
   a fuel pump configured to supply fuel from the fuel tank to the engine, wherein
   the vehicle body frame includes:
   a head pipe;
   one main frame extending rearward and downward from the head pipe;
   a cross member connected to a rear end of the one main frame and extending in a vehicle width direction;
   a pair of left and right body frames extending downward and rearward from the cross member; and
   a pair of left and right seat rails connected to the pair of left and right body frames, respectively,
   the cross member is disposed in front of the fuel pump, and
   the pair of left and right body frames are arranged to sandwich the fuel pump in the vehicle width direction in a top view, and are connected to the cross member.

2. The saddle vehicle according to claim 1, wherein an engine support bracket that supports the engine is attached to the cross member.

3. The saddle vehicle according to claim 1, wherein the fuel pump is attached to a flange formed on a lower surface of a rear portion of the fuel tank.

4. The saddle vehicle according to claim 1, wherein the fuel tank is provided so as to overlap the main frame in a plan view and a side view.

5. The saddle vehicle according to claim 1, wherein
   the vehicle body frame includes:
   a first cross frame that connects the pair of left and right seat rails; and
   a second cross frame that connects the pair of left and right body frames,
   a suspension support bracket that supports a rear suspension unit is provided so as to support an upper end of the rear suspension unit, and
   the suspension support bracket is provided so as to connect the first cross frame and the second cross frame.

6. The saddle vehicle according to claim 5, wherein the fuel pump is located in front of the first cross frame and above the second cross frame.

7. The saddle vehicle according to claim 1, wherein
   the fuel tank has a recess that is recessed upward at a bottom, and
   a predetermined gap is provided between the one main frame and a side wall of the recess in the vehicle width direction.

8. The saddle vehicle according to claim 7, wherein a cushioning member is provided between the cross member and the fuel tank.

* * * * *